(12) United States Patent
Matsuda

(10) Patent No.: US 10,233,978 B2
(45) Date of Patent: Mar. 19, 2019

(54) LOCK-UP DEVICE FOR TORQUE CONVERTER

(71) Applicant: EXEDY Corporation, Neyagawa-shi, Osaka (JP)

(72) Inventor: Satoru Matsuda, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 15/434,812

(22) Filed: Feb. 16, 2017

(65) Prior Publication Data

US 2017/0268579 A1 Sep. 21, 2017

(30) Foreign Application Priority Data

Mar. 18, 2016 (JP) ................................ 2016-055068

(51) Int. Cl.
| | |
|---|---|
| *F16D 13/52* | (2006.01) |
| *F16D 13/58* | (2006.01) |
| *F16D 25/08* | (2006.01) |
| *F16H 45/02* | (2006.01) |

(52) U.S. Cl.
CPC ............ *F16D 13/52* (2013.01); *F16D 13/583* (2013.01); *F16D 25/082* (2013.01); *F16H 45/02* (2013.01); *F16H 2045/0221* (2013.01); *F16H 2045/0284* (2013.01)

(58) Field of Classification Search
CPC ..... F16H 2045/0221; F16H 2045/0284; F16D 13/52; F16D 13/583; F16D 25/082
See application file for complete search history.

(56) References Cited

U.S. PATENT DOCUMENTS

| 3,285,379 | A | * | 11/1966 | Helquist | ............. | F16D 25/0638 |
| | | | | | | 192/109 A |
| 4,261,455 | A | * | 4/1981 | Uitenbroek | ......... | F16D 25/0638 |
| | | | | | | 192/106 F |
| 4,623,055 | A | * | 11/1986 | Ohkubo | .............. | F16D 25/0638 |
| | | | | | | 192/109 F |
| 5,960,923 | A | * | 10/1999 | Araki | .................. | F16D 25/0638 |
| | | | | | | 192/109 A |
| 6,817,460 | B2 | * | 11/2004 | Shoji | ................... | F16D 25/0638 |
| | | | | | | 192/85.34 |
| 6,892,869 | B2 | * | 5/2005 | Ookita | ................ | F16D 25/0638 |
| | | | | | | 192/109 A |

(Continued)

FOREIGN PATENT DOCUMENTS

JP 2012237441 A 12/2012

*Primary Examiner* — Stacy A Fluhart
(74) *Attorney, Agent, or Firm* — United IP Counselors, LLC

(57) ABSTRACT

A lock-up device for a torque converter is configured to transmit a torque from a front cover to a transmission-side member through a turbine. The lock-up device includes a clutch portion, a piston and an elastic member. The clutch portion is disposed between the front cover and the turbine, and includes a clutch plate. The piston is movable in an axial direction. The piston includes a pressing surface for pressing the clutch plate. The piston turns the clutch portion into a torque transmission state. The elastic member is disposed on a same side as the pressing surface of the piston. The elastic member is begins to elastically deform before the pressing surface contacts the clutch plate in conjunction with movement of the piston toward the clutch portion.

6 Claims, 7 Drawing Sheets

(56) References Cited

U.S. PATENT DOCUMENTS

| | | | | |
|---|---|---|---|---|
| 7,527,135 | B2* | 5/2009 | Ito | F16D 25/0638 |
| | | | | 192/109 F |
| 8,839,932 | B2* | 9/2014 | Kim | F16D 13/583 |
| | | | | 192/85.34 |
| 9,802,660 | B2* | 10/2017 | Johnson | B62D 55/1083 |
| 2014/0262666 | A1* | 9/2014 | Ushio | F16H 45/02 |
| | | | | 192/3.29 |
| 2014/0262674 | A1* | 9/2014 | Saito | B60K 6/387 |
| | | | | 192/70.11 |
| 2015/0267760 | A1* | 9/2015 | Hemphill | F16D 13/52 |
| | | | | 192/70.11 |
| 2017/0159739 | A1* | 6/2017 | Terada | F16D 13/52 |

* cited by examiner

LOCK-UP DEVICE FOR TORQUE CONVERTER

CROSS-REFERENCE TO RELATED APPLICATIONS

This application claims priority to Japanese Patent Application No. 2016-055068 filed on Mar. 18, 2016, the entirety of which is hereby incorporated by reference in its entirety.

BACKGROUND

Technical Field

The present disclosure relates to a lock-up device, and particularly to a lock-up device for a torque converter, which is configured to transmit a torque from a front cover to a transmission-side member through a turbine.

Background Information

Torque converters are often equipped with a lock-up device for directly transmitting a torque from a front cover to a turbine. Such a lock-up device includes a piston, an input-side plate, a plurality of torsion springs, and an output-side plate. The piston is capable of being coupled by friction to the front cover. The input-side plate is fixed to the piston. The torsion springs are supported by the input-side plate. The output-side plate is elastically coupled through the torsion springs to the piston and the input-side plate in a rotational direction. The output-side plate is fixed to the turbine.

Additionally, as described in Japan Laid-open Patent Application Publication No. 2012-237441, there has been also proposed a so-called multi-plate lock-up device that a plurality of clutch plates are used to increase its clutch capacity.

In the lock-up device described in Japan Laid-open Patent Application Publication No. 2012-237441, a clutch portion is disposed between the front cover and the turbine. The clutch portion includes a plurality of clutch plates. A lock-up state (power transmission state) is herein made when these clutch plates are pressed in contact with each other by the piston. In this state, a torque from the front cover is transmitted through the clutch portion directly to the turbine without intervention of a torque converter body.

In the lock-up device described in Japan Laid-open Patent Application Publication No. 2012-237441, the piston is configured to be activated by the hydraulic pressure and press the clutch plates, whereby the clutch plates are pressed in contact with each other. At this time, if the piston rapidly presses the clutch plates with a great force, shock occurs when the clutch-on state is made. It can be assumed to alleviate the shock by controlling the hydraulic pressure of hydraulic oil acting on the piston. However, it is not easy to control the hydraulic pressure so as not to cause the shock.

BRIEF SUMMARY

It is an object of the present disclosure to inhibit, with a simple construction, shock occurring when a clutch-on state of a lock-up device is made.

(1) A lock-up device for a torque converter according to the present disclosure is configured to transmit a torque from a front cover to a transmission-side member through a turbine. The lock-up device includes a clutch portion, a piston and an elastic member. The clutch portion is disposed between the front cover and the turbine. The clutch portion includes a clutch plate. The piston is disposed to be movable in an axial direction. The piston includes a pressing surface for pressing the clutch plate. The piston is configured to turn the clutch portion into a torque transmission state. The elastic member is disposed on a same side as the pressing surface of the piston. The elastic member is configured to begin to elastically deform before the pressing surface makes contact with the clutch plate in conjunction with movement of the piston toward the clutch portion.

In the present lock-up device, when the piston is moved in the axial direction, the elastic member mounted to the same side as the pressing surface is configured to firstly make contact with the clutch plate. When the piston is then further moved while the elastic member is elastically deforming, the piston is configured to press the clutch plate through the pressing surface. Accordingly, the clutch portion is configured to be turned into the torque transmission state.

In this construction, the elastic member is configured to make contact with the clutch plate before the piston presses the clutch plate through the pressing surface. Subsequently, the pressing surface of the piston makes contact with the clutch plate while the elastic member is elastically deforming. Hence, it is possible to alleviate shock occurring when the clutch-on state is made. Additionally, it is not required to perform a hydraulic control or so forth. Thus, it is possible to alleviate, with a simple construction, the shock occurring when the clutch-on state is made.

Moreover, the clutch plate is pressed in contact with the pressing surface of the piston. Specifically, the clutch plate is directly pressed in contact with the piston during elastic deformation of the elastic member. Hence, a stress acting on the elastic member can be reduced. Furthermore, the clutch plate can be reliably pressed.

(2) A displacement of the elastic member may be larger than a displacement of the piston, where the displacement of the elastic member is defined as sum of an axial distance of the elastic member moved in conjunction with the movement of the piston and an elastic deformation amount of the elastic member.

In this construction, similarly to the above, the clutch plate is directly pressed in contact with the piston during elastic deformation of the elastic member. Hence, the stress acting on the elastic member can be reduced. Furthermore, the clutch plate can be reliably pressed.

(3) The piston may be configured to directly apply a pressing load to the clutch portion through the pressing surface after the elastic member begins to elastically deform.

(4) The piston and the clutch plate configured to make contact with the pressing surface may be configured to be rotated in synchronization with each other.

(5) The piston may include an annular recess on the pressing surface. Additionally, the elastic member may be disposed in the recess. The elastic member may protrude toward the clutch portion in the axial direction, with a protruded end thereof being located closer to the clutch portion than the pressing surface.

(6) The elastic member may be a wave spring. The wave spring has a wavy shape in a plan view.

(7) The elastic member may be a coned disc spring.

Overall, according to the present disclosure described above, it is possible to inhibit, with the simple construction, the shock occurring when the clutch-on state of the lock-up device is made.

BRIEF DESCRIPTION OF THE DRAWINGS

Referring now to the attached drawings which form a part of this original disclosure.

DETAILED DESCRIPTION OF EMBODIMENTS

Figure 1:
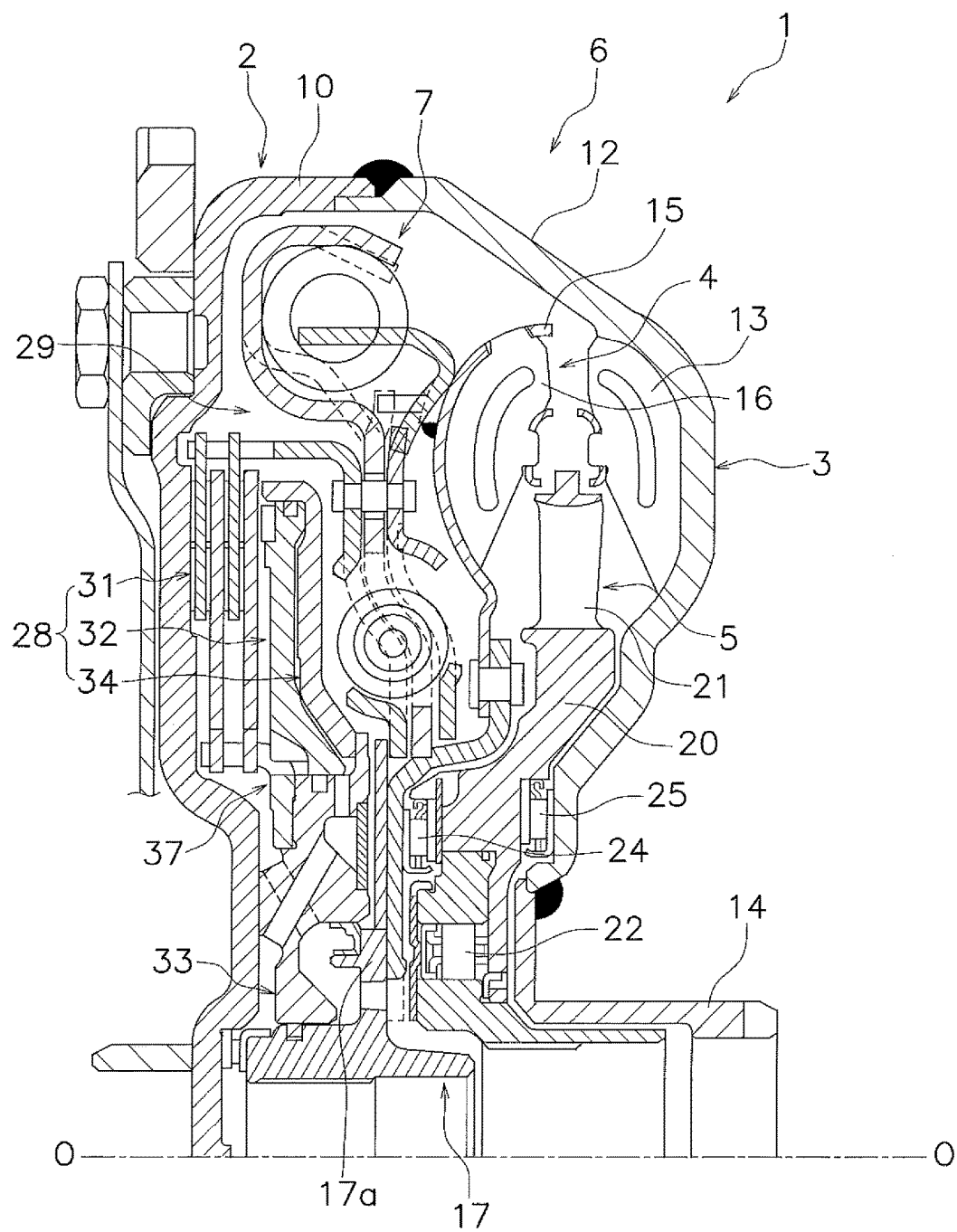
FIG. 1 is a cross-sectional view of a torque converter including a lock-up device according to a preferred embodiment of the present disclosure.

FIG. 1 is a partial cross-sectional view of a torque converter 1 including a lock-up device according to a preferred embodiment of the present disclosure. In FIG. 1, an engine (not shown in the drawing) is disposed on the left side whereas a transmission (not shown in the drawing) is disposed on the right side. It should be noted that line O-O depicted in FIG. 1 indicates a common rotational axis for the torque converter 1 and the lock-up device. It should be also noted that in the following explanation, the term "radial direction" refers to a direction separating from the rotational axis whereas the term "axial direction" refers to a direction arranged along the rotational direction.

(Entire Construction of Torque Converter 1)

The torque converter 1 is a device configured to transmit a torque from an engine-side crankshaft (not shown in the drawings) to an input shaft of the transmission. As shown in FIG. 1, the torque converter 1 is composed of a front cover 2, a torque converter body 6 and a lock-up device 7.

The front cover 2 is fixed to an input-side member. The front cover 2 is a substantially disc-shaped member, and its outer peripheral part protrudes toward the transmission as an outer peripheral tubular part 10.

The torque converter body 6 is composed of three types of bladed wheels (an impeller 3, a turbine 4 and a stator 5).

The impeller 3 is composed of an impeller shell 12, a plurality of impeller blades 13 and an impeller hub 14. The impeller shell 12 is fixed to the outer peripheral tubular part 10 of the front cover 2 by welding. The impeller blades 13 are fixed to the inside of the impeller shell 12. The impeller hub 14 has a tubular shape and is disposed on the inner peripheral side of the impeller shell 12.

The turbine 4 is disposed in opposition to the impeller 3 within a fluid chamber. The turbine 4 is composed of a turbine shell 15, a plurality of turbine blades 16 and a turbine hub 17. The turbine blades 16 are fixed to the inside of the turbine shell 15. The turbine hub 17 is fixed to the inner peripheral part of the turbine shell 15. The turbine hub 17 includes a flange 17a extending radially outside. The inner peripheral part of the turbine shell 15 is fixed to the flange 17a by welding or a plurality of rivets (not shown in the drawings). Additionally, the turbine hub 17 is provided with a spline hole in its inner peripheral part. The spline hole is engaged with the input shaft of the transmission (not shown in the drawings).

The stator 5 is configured to regulate the flow of hydraulic oil returning from the turbine 4 to the impeller 3, and is disposed between the inner peripheral part of the impeller 3 and that of the turbine 4. The stator 5 is mainly composed of a stator carrier 20 and a plurality of stator blades 21 mounted to the outer peripheral surface of the stator carrier 20. The stator carrier 20 is supported by a stationary shaft through a one-way clutch 22. It should be noted that thrust bearings 24 and 25 are disposed axially on the both sides of the stator carrier 20.

(Lock-Up Device 7)

Figure 2:
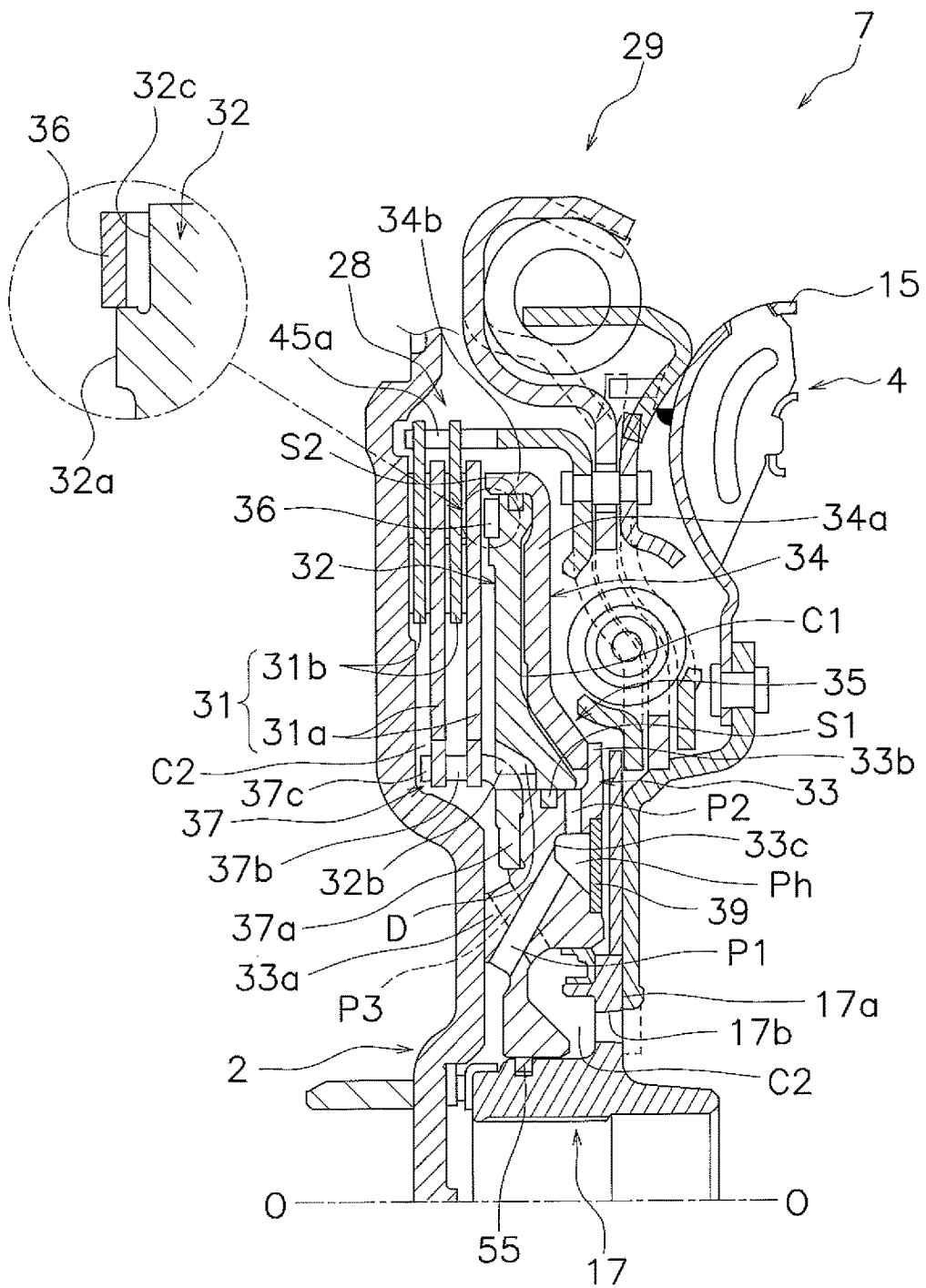
FIG. 2 is a diagram extracted from FIG. 1 and shows a part for supporting a clutch portion and a piston.

As shown in FIGS. 1 and 2, the lock-up device 7 is disposed in a space between the front cover 2 and the turbine 4. The lock-up device 7 includes a clutch unit 28 and a damper portion 29.

<Clutch Unit 28>

As shown in FIGS. 1 and 2, the clutch unit 28 is a multi-plate clutch. The clutch unit 28 includes a plurality of clutch plates 31 (clutch portion), a piston 32, and a support member 35. The support member 35 is composed of a sleeve 33 and an oil chamber plate 34.

—Clutch Plates 31—

The plural clutch plates 31 are disposed between the front cover 2 and the piston 32. The plural clutch plates 31 include two first clutch plates 31a and two second clutch plates 31b. The first clutch plates 31a have an annular shape, and likewise, the second clutch plates 31b have an annular shape. These two types of clutch plates, i.e., the first and second clutch plates 31a and 31b, are alternately disposed while being aligned in the axial direction. Each first clutch plate 31a is provided with a plurality of teeth on its inner peripheral part. Each of the first and second clutch plates 31a and 31b is provided with a friction facing fixed to one lateral surface thereof. Each of the second clutch plates 31b is provided with a plurality of teeth on its outer peripheral part.

—Piston 32—

The piston 32 has an annular shape and is disposed on the transmission side of the front cover 2. The piston 32 is supported by the support member 35 while being movable in the axial direction. The piston 32 includes a pressing part 32a and a plurality of engaging protrusions 32b.

The pressing part 32a is a part through which the piston 32 presses the plural clutch plates 31 toward the front cover 2. The pressing part 32a is provided on the outer peripheral part of the piston 32 so as to be opposed to the plural clutch plates 31 in the axial direction. Additionally, as shown in a partial close-up view of FIG. 2, the pressing part 32a is provided with an annular recess 32c on its outer peripheral part. The annular recess 32c is recessed by a predetermined depth from the surface of the pressing part 32a. A wave spring 36, provided as an elastic member, is disposed in the annular recess 32c.

The thickness of the wave spring 36 is greater than the depth of the annular recess 32c. Therefore, when the wave spring 36 is in a free state without being compressed, the clutch plate 31-side surface of the wave spring 36 protrudes beyond the surface of the pressing part 32a. Additionally, the displacement of the wave spring 36 is larger than that of the piston 32, where the displacement of the wave spring 36 is defined as the sum of the axial distance of the wave spring 36 moved in conjunction with movement of the piston 32 and the amount of elastic deformation of the wave spring 36.

For example, when the piston 32 is separated from the closest one of the clutch plates 31 by 1.1 mm, the displacement of the piston 32 is "1.1 mm+α (abrasion amount)". On the other hand, when the wave spring 36 is separated from the closest one of the clutch plate 31 by 0.7 mm, the distance of the wave spring 36 moved in conjunction with movement of the piston 32 is 0.7 mm. As an exemplary setting, the wave spring 36 is herein set to be elastically deformable by up to 0.58 mm. Therefore, "0.7 mm (the moving distance of the wave spring 36)+0.58 mm (the elastic deformation amount of the wave spring 36)" is larger than "1.1 mm+α (the displacement of the piston 32)".

With the aforementioned construction, when the piston 36 is moved toward the clutch plates 31 in the lock-up state, the wave spring 36 firstly makes contact with the closest one of the clutch plates 31, and then elastically deforms. Subsequently, when the piston 32 is further moved, the pressing part 32a of the piston 32 directly makes contact with the closest one of the clutch plates 31 during elastic deformation of the wave spring 36. Thereafter, the clutch plates 31 are pressed in contact with each other directly by the piston 32.

Figure 3:
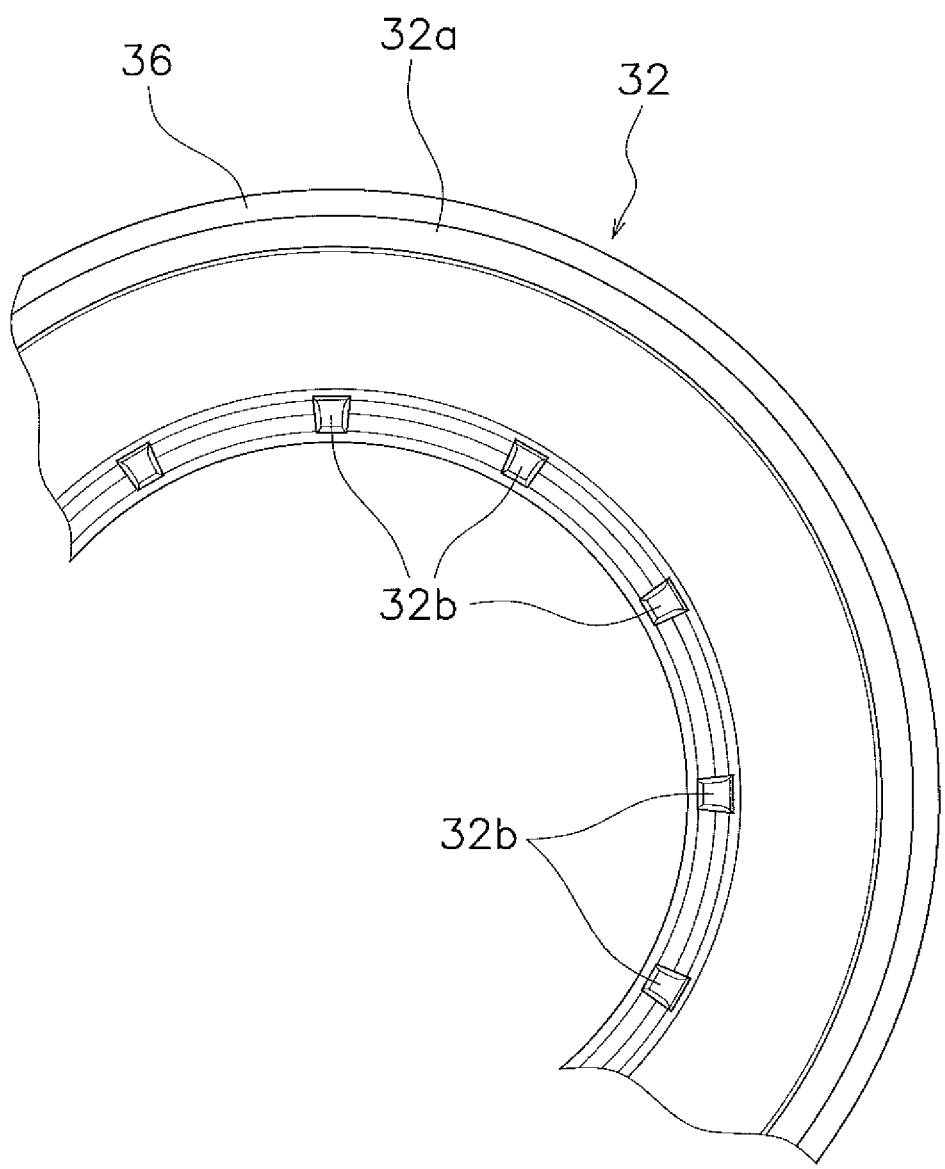
FIG. 3 is a partial front view of the piston.

The engaging protrusions 32b are provided on the inner peripheral part of the piston 32, and protrude therefrom to the inner peripheral side. As shown in FIG. 3, the plural engaging protrusions 32b are provided at predetermined intervals in the circumferential direction. It should be noted that FIG. 3 is a front view of the piston 32 seen from the front cover 2 side.

—Support Member 35—

The sleeve 33 composes part of the support member 35 and includes an annular protrusion 33a. The annular protrusion 33a axially protrudes from the front cover 2-side lateral surface of the sleeve 33. Therefore, gaps are produced between the front cover 2 and the sleeve 33, and are located on the inner peripheral side and the outer peripheral side of the annular protrusion 33a, respectively. The annular protrusion 33a is fixed to one lateral surface of the front cover 2 by welding or so forth. Thus, the sleeve 33 is configured to be rotated in synchronization with the front cover 2. Additionally, the sleeve 33 is provided with a flange 33b on the turbine 4-side end of its outer peripheral part. The flange 33b has an annular shape and extends radially outward.

A drive hub 37 is fixed to the sleeve 33. The drive hub 37 supports the first clutch plates 31a. The drive hub 37 includes a hub body 37a and a tubular part 37b. The hub body 37a has a substantially annular disc shape. The tubular part 37b is formed by bending the outer peripheral part of the hub body 37a toward the front cover 2.

The hub body 37a is fixed to the front cover 2-side lateral surface of the sleeve 33. The tubular part 37b is provided with a plurality of slits 37c. The slits 37c extend in the axial direction, while being aligned at predetermined intervals in the circumferential direction. The slits 37c are opened on the front cover 2 side. The teeth, provided on the inner peripheral part of the first clutch plates 31a, are engaged with the plural slits 37c. With this construction, the first clutch plates 31a are non-rotatable relatively to the drive hub 37 (i.e., the sleeve 33) but are movable relatively thereto in the axial direction.

The oil chamber plate 34 composes part of the support member 35 and is disposed on the turbine 4 side of the piston 32. The oil chamber plate 34 includes a body 34a and a tubular part 34b. The body 34a has an annular disc shape. The tubular part 34b is provided on the outer peripheral part of the body 34a. The body 34a is fixed at its inner peripheral part to the flange 33b of the sleeve 33. The tubular part 34b is formed by bending the outer peripheral part of the body 34a toward the front cover 2. Additionally, the outer peripheral part of the piston 32 is supported by the tubular part 34b while being movable in the axial direction.

<Support Structure for Oil Chamber Plate 34>

The oil chamber plate 34 is fixed at the inner peripheral part of the body 34a to the front cover 2-side lateral surface of the flange 33b of the sleeve 33 by welding. The oil chamber plate 34 is herein a member for defining an oil chamber (a first oil chamber C1 to be described) together with the piston 32 therebetween. Therefore, when the hydraulic oil is supplied to the oil chamber, a force acts on the oil chamber plate 34 in a direction separating from the piston 32. However, the oil chamber plate 34 is fixed to the piston 32-side lateral surface of the flange 33b, i.e., the surface facing in a direction opposite to the direction that the aforementioned force acts on the oil chamber plate 34. Hence, the oil chamber 34, receiving the force generated by a hydraulic pressure, is supported by the flange 33b. Accordingly, deformation of the oil chamber plate 34 can be inhibited.

<Synchronization Mechanism>

The engaging protrusions 32b of the piston 32 are engaged with the slits 37c of the drive hub 37, respectively. With this construction, the piston 32 is configured to be rotated in synchronization with the sleeve 33 and the front cover 2 through the drive hub 37. In other words, a synchronization mechanism for rotating the piston 32 in synchronization with the support member 35 is composed of the slits 37c of the drive hub 37 and the engaging protrusions 32b of the piston 32.

It should be noted that the slits 37c and the engaging protrusions 32b of the piston 32 are engaged over the entire moving range of the piston 32. Therefore, even when the piston 32 is moved in the axial direction, the slits 37c and the engaging protrusions 32b are not disengaged from each other.

<Hydraulic Circuit>

The sleeve 33 is provided with a seal member 51 on its outer peripheral surface. Thus, the seal member S1 seals between the outer peripheral surface of the sleeve 33 and the inner peripheral surface of the piston 32. On the other hand, the piston 32 is provided with a seal member S2 on its outer peripheral surface. The seal member S2 seals between the outer peripheral surface of the piston 32 and the inner peripheral surface of the tubular part 34b of the oil chamber plate 34. With these constructions, the first oil chamber C1 is defined between the piston 32 and the oil chamber plate 34 in order to press the piston 32 toward the clutch plates 31.

The sleeve 33 is provided with a hydraulic circuit. The hydraulic oil supplied from the inner peripheral part of the turbine hub 17 is supplied to the first oil chamber C1 through the hydraulic circuit. The hydraulic circuit includes a first oil channel P1, a second oil channel P2 and an oil sump Ph.

The oil sump Ph is provided on the turbine 4-side lateral surface of the sleeve 33. More specifically, a groove 33c is provided on the turbine 4-side lateral surface of the sleeve 33. The groove 33c is an annular groove recessed toward the front cover 2. Additionally, a plate 39 having an annular shape is fixed to the sleeve 33 so as to cover the groove 33c. In other words, the oil sump Ph is defined by the groove 33c and the plate 39.

The first oil channel P1 is provided from the inner peripheral surface of the annular protrusion 33a of the sleeve 33 to the oil sump Ph. The first oil channel P1 is composed of a plurality of holes, each of which tilts to get closer to the turbine 4 from the inner peripheral side to the outer peripheral side of the sleeve 33.

The second oil channel P2 is provided whereby the oil sump Ph and the first oil chamber C1 are communicated therethrough. The second oil channel P2 is composed of a plurality of holes. The holes radially extend to be orthogonal to the rotational axis.

It should be noted that the entire channel area of the second oil channel P2 is set to be smaller than that of the first oil channel P1. Additionally, the diameter of each of the holes composing the second oil channel P2 is smaller than that of each of the holes composing the first oil channel P1. With the constructions, an orifice effect can be exerted when the hydraulic oil flows through the first oil channel P1 and the second oil channel P2. Accordingly, the flow rate of the hydraulic oil flowing out of the second oil channel P2 can be inhibited low, and pulsation of the flow rate of an oil pump can be inhibited. Consequently, shock can be alleviated when a clutch-on state is made. Moreover, in the present preferred embodiment, the oil sump Ph is defined between the first oil channel P1 and the second oil channel P2. Hence, pulsation of the flow rate of the oil pump can be further inhibited.

On the other hand, a second oil chamber C2 is defined between the inner peripheral part of the sleeve 33 and the turbine hub 17. The hydraulic oil is supplied to the second oil chamber C2 through a hole 17*b* provided in the flange 17*a* of the turbine hub 17. Additionally, the sleeve 33 is provided with a third oil channel P3. The second oil chamber C2 and a space accommodating the clutch plates 31 are communicated through the third oil channel P3.

<Damper Portion 29>

Figure 4:
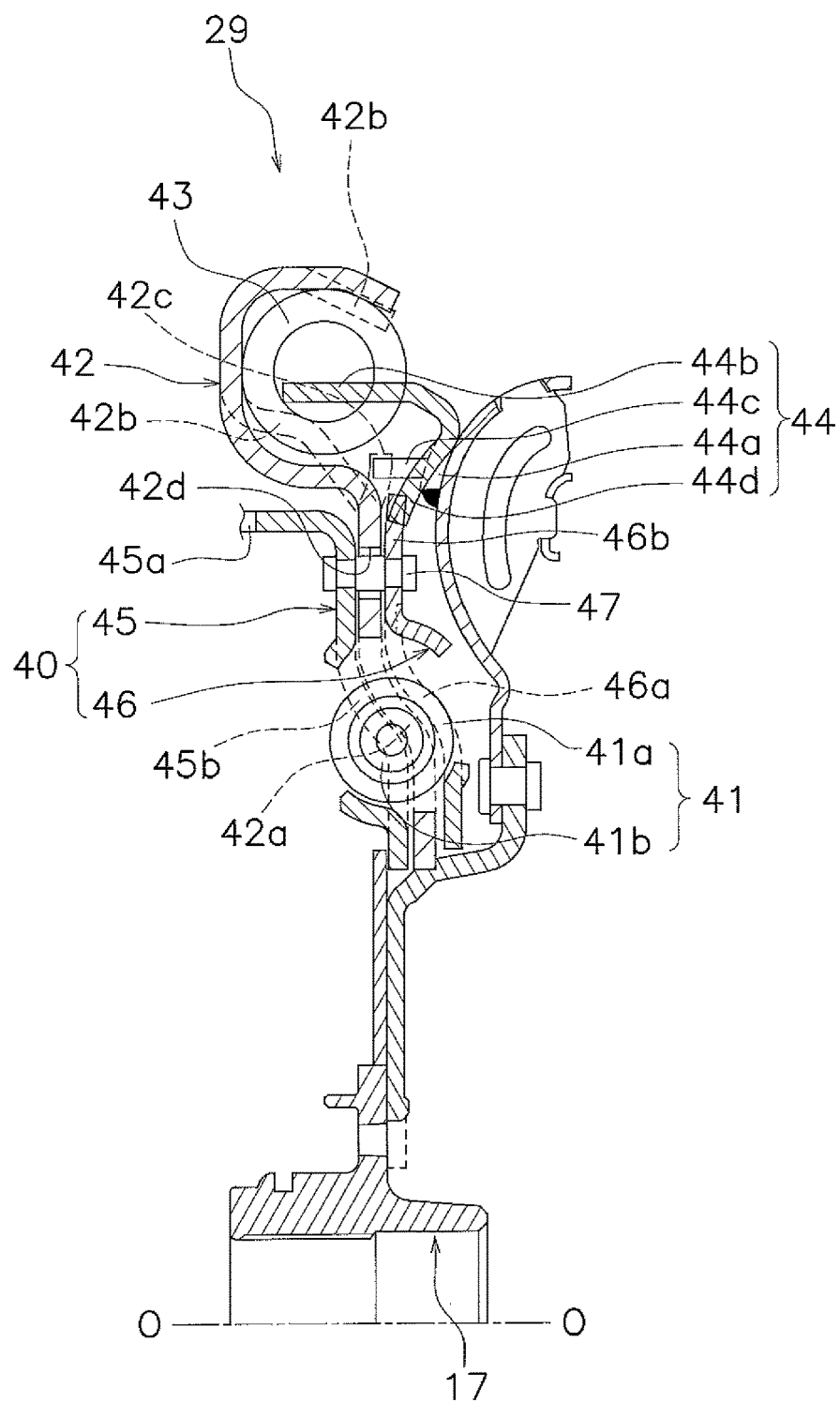
FIG. 4 is a diagram extracted from FIG. 1 and shows a damper portion.

The damper portion 29 is configured to attenuate vibration to be inputted thereto through the front cover 2. As shown in FIG. 4, the damper portion 29 includes an input-side plate 40, inner peripheral side torsion springs 41, an intermediate plate 42, outer peripheral side torsion springs 43 and a driven plate 44.

—Input-Side Plate 40—

The input-side plate 40 is mounted on the output side of the clutch unit 28. Specifically, the input-side plate 40 includes a first side plate 45 and a second side plate 46.

The first side plate 45 is the engine-side one of the plates composing the input-side plate 40. The first side plate 45 includes a first clutch engaging part 45*a* extending toward the front cover 2 and a plurality of first spring engaging parts 45*b*.

The first clutch engaging part 45*a* has a substantially tubular shape. The first clutch engaging part 45*a* is provided with a plurality of grooves. The grooves extend in the axial direction while being aligned at predetermined intervals in the circumferential direction. The teeth provided on the outer peripheral part of each second clutch plate 31*b* are engaged with the grooves. With this construction, the second clutch plates 31*b* and the first side plates 45 are non-rotatable relatively to each other but are movable relatively to each other in the axial direction.

The first spring engaging parts 45*b* are provided in a part extended radially inside from the turbine side end of the first clutch engaging part 45*a*. Specifically, the first spring engaging parts 45*b* are window parts disposed at predetermined intervals in the circumferential direction. Each first spring engaging part 45*b* is provided with cut-and-raised parts. The cut-and-raised parts are formed by cutting and raising the inner peripheral side edge and the outer peripheral side edge of each first spring engaging part 45*b* in the axial direction. The inner peripheral side torsion springs 41 are disposed in the first spring engaging parts 45*b*, respectively. Additionally, a pair of circumferentially opposed walls of each first spring engaging part 45*b* is engaged with the both ends of each inner peripheral side torsion spring 41.

The second side plate 46 is the transmission-side one of the plates composing the input-side plate 40. The second side plate 46 is disposed at a predetermined interval from the first side plate 45 in the axial direction. The second side plate 46 is fixed to the first side plate 45 by a plurality of stud pins 47 so as to be unitarily rotatable therewith.

The second side plate 46 includes a plurality of second spring engaging parts 46*a*. The second spring engaging parts 46*a* are window parts disposed at predetermined intervals in the circumferential direction. The second spring engaging parts 46*a* are disposed in axial opposition to the first spring engaging parts 45*b*, respectively. Each second spring engaging part 46*a* is provided with cut-and-raised parts. The cut-and-raised parts are formed by cutting and raising the inner peripheral side edge and the outer peripheral side edge of each second spring engaging part 46*a* in the axial direction. The inner peripheral side torsion springs 41 are disposed in the second spring engaging parts 46*a*, respectively. Additionally, a pair of circumferentially opposed walls of each second spring engaging part 46*a* is engaged with the both ends of each inner peripheral side torsion spring 41.

—Inner Peripheral Side Torsion Springs 41—

The plural inner peripheral side torsion springs 41 are disposed in alignment with each other in the circumferential direction.

Each of the inner peripheral side torsion springs 41 is composed of a large coil spring 41*a* and a small coil spring 41*b*. The small coil spring 41*b* is inserted in the interior of the large coil spring 41*a*. The spring length of the small coil spring 41*b* is shorter than that of the large coil spring 41*a*.

Each of the inner peripheral side torsion springs 41 is disposed in each of the first spring engaging parts 45*b* (window parts) of the first side plate 45, each of the second spring engaging parts 46*a* (window parts) of the second side plate 46, and each of third spring engaging parts 42*a* (window parts) of the intermediate plate 42 to be described. Each inner peripheral side torsion spring 41 is supported at both of its circumferential ends and both of its radial ends by the first, second and third spring engaging parts 45*b*, 46*a* and 42*a* (window parts). Additionally, each inner peripheral side torsion spring 41 is restricted from jumping out by the cut-and-raised parts of each first spring engaging part 45*b* (window part) and those of each second spring engaging part 46*a* (window part).

—Intermediate Plate 42—

The intermediate plate 42 is disposed axially between the first side plate 45 and the second side plate 46. The intermediate plate 42 is rotatable relatively to the first side plate 45, the second side plate 46 and the driven plate 44. The intermediate plate 42 is a member for causing the inner peripheral side torsion springs 41 and the outer peripheral side torsion springs 43 to act in series.

The outer peripheral part of the intermediate plate 42 has a substantially tubular shape and is opened toward the turbine 4. The tubular outer peripheral part of the intermediate plate 42 holds the outer peripheral side torsion springs 43. Additionally, fifth spring engaging parts 44*b* of the driven plate 44 to be described are disposed in the opening of the tubular outer peripheral part.

The intermediate plate 42 includes the plurality of third spring engaging parts 42*a*, a plurality of fourth spring engaging parts 42*b* and an elongated hole 42*d*.

The third spring engaging parts 42*a* are provided in the inner peripheral part of the intermediate plate 42, and are engaged with the inner peripheral side torsion springs 41, respectively. The third spring engaging parts 42*a* are window parts disposed at predetermined intervals in the circumferential direction. Each third spring engaging part 42*a* is disposed axially between, and in opposition to, each pair of the first spring engaging part 45*b* and the second spring engaging part 46*a*. The inner peripheral side torsion springs 41 are disposed in the third spring engaging parts 42*a*, respectively. Additionally, a pair of circumferentially opposed walls of each third spring engaging part 42*a* is engaged with the both ends of each inner peripheral side torsion spring 41.

The fourth spring engaging parts 42*b* are provided in the outer peripheral part of the intermediate plate 42, while being aligned at predetermined intervals in the circumferential direction. The fourth spring engaging parts 42*b* are engaged with the outer peripheral side torsion springs 43. Circumferentially adjacent two of the fourth spring engaging parts 42*b* are engaged with the both ends of each outer peripheral side torsion spring 43. When described in detail, circumferentially adjacent two of the fourth spring engaging parts 42*b* are engaged with the inner peripheral parts and the outer peripheral parts of the both ends of each outer peripheral side torsion spring 43.

The elongated hole 42*d* has a circumferentially elongated shape. The stud pins 47 are inserted through the elongated hole 42*d*. When described in detail, the trunk part of each stud pin 47 is inserted through the elongated hole 42*d*. Under the condition, the both ends of each stud pin 47 are fixed to the first side plate 45 and the second side plate 46. The intermediate plate 42 is attached to the first and second side plates 45 and 46 through the stud pins 47, while being rotatable relatively thereto.

—Outer Peripheral Side Torsion Springs 43—

The plural outer peripheral side torsion springs 43 are disposed in alignment with each other in the circumferential direction. Additionally, the outer peripheral side torsion springs 43 are disposed radially outside the clutch unit 28.

The outer peripheral side torsion springs 43 are held by the outer peripheral part of the intermediate plate 42, and are configured to act in series with the inner peripheral side torsion springs 41 through the intermediate plate 42.

Each outer peripheral side torsion spring 43 is supported at its both circumferential ends by circumferentially adjacent two of the fourth spring engaging parts 42*b* of the intermediate plate 42. Additionally, each outer peripheral side torsion spring 43 is restricted from jumping out to the radially outside by the outer peripheral part (tubular part) of the intermediate plate 42, while being interposed between circumferentially adjacent two of the fourth spring engaging parts 42*b*. Moreover, each outer peripheral side torsion spring 43 makes contact at its both circumferential ends with circumferentially adjacent two of the fifth spring engaging parts 44*b* of the driven plate 44.

—Driven Plate 44—

The driven plate 44 is an annular disc member and is fixed to the turbine shell 15. Additionally, the driven plate 44 is rotatable relatively to the intermediate plate 42.

The driven plate 44 includes a body 44*a*, the plural fifth spring engaging parts 44*b*, a first stopper pawl 44*c* and a second stopper pawl 44*d*.

The body 44*a* has a substantially annular shape and is fixed to the turbine shell 15. When described in detail, the body 44*a* is fixed to the turbine shell 15 by fixation means such as welding.

The plural fifth spring engaging parts 44*b* are provided on the outer peripheral side of the body 44*a* while being integrated with the body 44*a*. The fifth spring engaging parts 44*b* extend axially toward the engine from the body 44*a*. The fifth spring engaging parts 44*b* are engaged with the outer peripheral side torsion springs 43. The fifth spring engaging parts 44*b* are formed by bending the outer peripheral part of the driven plate 44 axially toward the engine.

The fifth spring engaging parts 44*b* are disposed at predetermined intervals in the circumferential direction. Each outer peripheral side torsion spring 43 is disposed between circumferentially adjacent two of the fifth spring engaging parts 44*b*. Circumferentially adjacent two of the fifth spring engaging parts 44*b* are engaged with the both ends of each outer peripheral side torsion spring 43.

<Stopper Mechanisms>

In the present preferred embodiment, stopper mechanisms are composed of part of the intermediate plate 42, part of the second side plate 46, and part of the driven plate 44. The stopper mechanisms are configured to restrict relative rotation among these plates 42, 46 and 44. The stopper mechanisms will be hereinafter explained in detail.

The intermediate plate 42 is provided with a cutout 42*c* in its radially intermediate part. The cutout 42*c* is provided radially between the third spring engaging parts 42*a* and the fourth spring engaging parts 42*b*. The cutout 42*c* has a circumferentially elongated shape and is opened to the outer peripheral side. On the other hand, the driven plate 44 is provided with a first stopper pawl 44*c* as described above. The first stopper pawl 44*c* is inserted into the cutout 42*c*.

The first stopper pawl 44*c* is provided on the inner peripheral part of the driven plate 44, i.e., the inner peripheral part of the body 44*a*. The first stopper pawl 44*c* is a part extending axially toward the engine from the inner peripheral part of the body 44*a*. When described in detail, the first stopper pawl 44*c* is formed by partially bending the inner peripheral part of the body 44*a* axially toward the engine.

With the aforementioned construction, the intermediate plate 42 is restricted from rotating relatively to the driven plate 44 by the contact of the first stopper pawl 44*c* with one of the circumferential end surfaces of the cutout 42*c* of the intermediate plate 42. In other words, one stopper mechanism is composed of the first stopper pawl 44*c* and the cutout 42*c* of the intermediate plate 42.

Additionally, the second side plate 46 is provided with a cutout 46*b* on its outer peripheral end. The cutout 46*b* is opened to the outer peripheral side. On the other hand, the driven plate 44 is provided with the second stopper pawl 44*d* as described above. The second stopper pawl 44*d* is inserted into the cutout 46*b*.

The second stopper pawl 44*d* is provided on the inner peripheral part of the driven plate 44, i.e., the inner peripheral part of the body 44*a*. The second stopper pawl 44*d* is formed by partially extending the inner peripheral part of the body 44*a* to the further inner peripheral side.

With the aforementioned construction, the first and second side plates 45 and 46 are restricted from rotating relatively to the driven plate 44 by the contact of the second stopper pawl 44*d* with one of the end surfaces of the cutout 46*b* of the second side plate 46. In other words, the other stopper mechanism is composed of the second stopper pawl 44*d* and the cutout 46*b* of the second side plate 46.

<Positioning Structure for Damper Portion 29>

Figure 5:
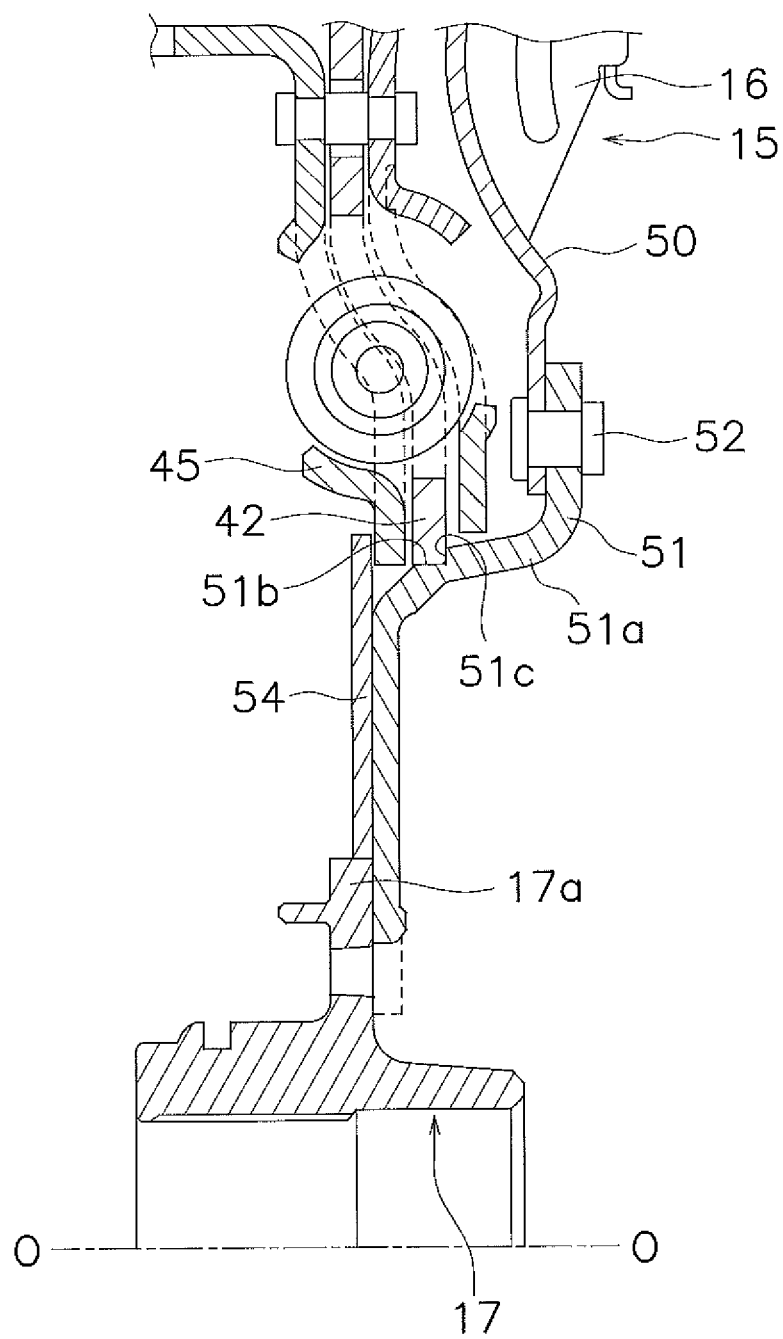
FIG. 5 is a diagram of a positioning structure of the damper portion.

A structure for positioning the damper portion 29 will be explained with reference to FIG. 5. This positioning structure is provided for positioning the damper portion 29 in the radial direction and the axial direction.

In the present preferred embodiment, the turbine shell 15 includes a turbine shell body 50 and a coupling member 51. The turbine blades 16 are disposed inside the turbine shell body 50. The coupling member 51 is coupled at its outer peripheral part to the inner peripheral part of the turbine shell body 50 by rivets 52, while being coupled at its inner peripheral part to the flange 17*a* of the turbine hub 17 by welding or rivets (not shown in the drawing). The coupling member 51 includes a tubular part 51*a* in its radially intermediate part. The tubular part 51*a* extends in the axial direction.

The tubular part 51a is provided with a first positioning surface 51b and a second positioning surface 51c. The first and second positioning surfaces 51b and 51c are formed by cutting or so forth. The first positioning surface 51b has an annular shape and is arranged in parallel to the rotational axis. The second positioning surface 51c has an annular shape, and extends radially outward from the turbine 4-side end of the first positioning surface 51b while being arranged orthogonally to the rotational axis.

Additionally, the inner peripheral end surface of the intermediate plate 42 of the damper portion 29 makes contact with the first positioning surface 51b. Accordingly, the entire damper portion 29 is positioned in the radial direction. On the other hand, a lateral surface of the inner peripheral end of the intermediate plate 42 makes contact with the second positioning surface 51c. Accordingly, the entire damper portion 29 is restricted from moving axially toward the turbine.

Moreover, a restriction plate 54, having an annular disc shape, is fixed to the front cover 2-side lateral surface of the inner peripheral part of the coupling member 51. The restriction plate 54 extends to the outer peripheral side than the inner peripheral end of the first side plate 45 of the damper portion 29. Additionally, the front cover 2-side lateral surface of the first side plate 45 is contactable to the outer peripheral end of the restriction plate 54. With this construction, the entire damper portion 29 is restricted from moving axially toward the front cover 2.

(Actions)

First, an action of the torque converter body 6 will be explained. During rotation of the front cover 2 and the impeller 3, the hydraulic oil flows from the impeller 3 to the turbine 4, and further flows to the impeller 3 through the stator 5. Accordingly, a torque is transmitted from the impeller 3 to the turbine 4 through the hydraulic oil. The torque transmitted to the turbine 4 is transmitted to the input shaft of the transmission through the turbine hub 17.

It should be noted that during running of the engine, the hydraulic oil constantly flows into the second oil chamber C2 through the hole 17b of the turbine hub 17 and is further supplied to the clutch plates 31 and the impeller 3 through the third oil channel P3.

When the speed ratio of the torque converter 1 increases and rotation of the input shaft reaches a predetermined velocity, the hydraulic oil is supplied to the first oil chamber C1 through the first oil channel P1, the oil sump Ph and the second oil channel P2. At this time, the hydraulic pressure in the first oil chamber C1 is higher than that of the hydraulic oil supplied to the side on which the clutch plates 31 are disposed. Accordingly, the piston 32 is moved toward the front cover 2. As a result, the pressing part 32a of the piston 32 presses the clutch plates 31 toward the front cover 2, whereby a lock-up state (clutch-on state) is made.

In the aforementioned clutch-on state, a torque is transmitted from the front cover 2 to the torque converter body 6 through the lock-up device 7. Specifically in the lock-up device 7, the torque inputted into the front cover 2 is sequentially transmitted to the clutch plates 31, the first and second side plates 45 and 46, the inner peripheral side torsion springs 41 (the large coil springs 41a and the small coil springs 41b), the intermediate plate 42, the outer peripheral side torsion springs 43, and the driven plate 44 in this order, and is then outputted to the turbine hub 17.

The lock-up device 7 turned into the clutch-on state is herein configured to transmit a torque as described above and simultaneously attenuate fluctuation in torque inputted thereto through the front cover 2. Specifically, when torsional vibration occurs in the lock-up device 7, the inner peripheral side torsion springs 41 and the outer peripheral side torsion springs 43 are configured to be compressed in series between the first and second side plates 45 and 46 and the driven plate 44. Fluctuation in torque, occurring with torsional vibration, is thus attenuated by the activation of the inner peripheral side torsion springs 41 and the outer peripheral side torsion springs 43.

It should be noted that when the lock-up state is turned off (i.e., a clutch-off state is made), the first oil chamber C1 is configured to be connected to a drain. Accordingly, the hydraulic oil in the first oil chamber C1 is discharged through the second oil channel P2, the oil sump Ph and the first oil channel P1. In this condition, the hydraulic pressure in the first oil chamber C1 becomes lower than that of the side on which the clutch plates 31 are disposed. Hence, the piston 32 is moved toward the turbine 4. As a result, the pressure applied to the clutch plates 31 from the pressing part 32a of the piston 32 is released. Accordingly, the clutch-off state is made.

(Torsional Characteristics)

Figure 6:
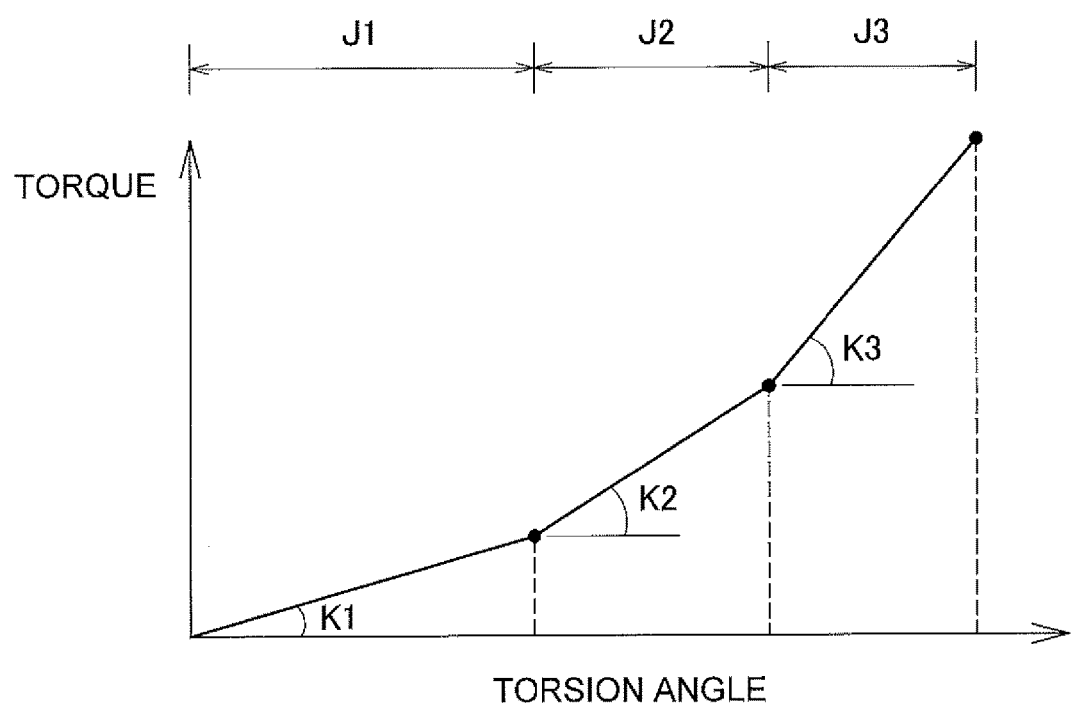
FIG. 6 is a chart showing torsional characteristics of the lock-up device.

Next, torsional characteristics will be explained with FIG. 6. In the clutch-on state of the lock-up device 7, a torque inputted through the front cover 2 is transmitted to the damper portion 29 through the clutch plates 31. At this time, when relative rotation occurs among the first and second side plates 45 and 46, the intermediate plate 42 and the driven plate 44 and a torsion angle is produced among them, the outer peripheral side torsion springs 43 and the large coil springs 41a of the inner peripheral side torsion springs 41 are compressed in series through the intermediate plate 42. Accordingly, a first torsional stiffness K1 is formed. In FIG. 6, reference sign J1 represents a range in which a torque with respect to a torsion angle is determined by the first torsional stiffness K1.

Next, with increase in torque to be transmitted, a relative rotation angle (torsion angle) increases between the intermediate plate 42 and the first and second side plates 45 and 46. When the relative rotation angle therebetween becomes a predetermined angle, the small coil springs 41b of the inner peripheral side torsion springs 41 are also compressed. In other words, in this condition, the large coil springs 41a of the inner peripheral side torsion springs 41 and the outer peripheral side torsion springs 43 are compressed in series, and simultaneously, the large coil springs 41a and the small coil springs 41b of the inner peripheral side torsion springs 41 are compressed in parallel.

A second torsional stiffness K2 is formed by the aforementioned actions. In FIG. 6, reference sign J2 represents a range in which the torque with respect to the torsion angle is determined by the second torsional stiffness K2. Subsequently, with further increase in torsion angle, the first stopper pawl 44c of the driven plate 44 makes contact with one of the end surfaces of the cutout 42c of the intermediate plate 42.

With further increase in torque to be transmitted, the relative rotation angle (torsion angle) further increases among the first and second side plates 45 and 46, the intermediate plate 42 and the driven plate 44 (in this condition, the intermediate plate 42 and the driven plate 44 are rotated in synchronization with each other). Relative rotation between the intermediate plate 42 and the driven plate 44 is thus prevented in and after the range J2. Hence, the outer peripheral side torsion springs 43 are deactivated. In other words, in and after the range J2, the large coil springs 41a and the small coil springs 41b of the inner peripheral side torsion springs 41 are compressed.

A third torsional stiffness K3 is formed by the aforementioned actions. In FIG. 6, reference sign J3 represents a range in which the torque with respect to the torsion angle is determined by the third torsional stiffness K3. Subsequently, with further increase in torsion angle, the second stopper pawl 44*d* of the driven plate 44 makes contact with one end surface of the cutout 46*b* of the second side plate 46. In this condition, the large coil springs 41*a* and the small coil springs 41*b* of the inner peripheral side torsion springs 41 are deactivated.

(Features)

In the preferred embodiment as described above, when the piston 32 is moved toward the clutch plates 31 in the clutch-on state of the lock-up device 7, the wave spring 36 mounted to the piston 32 firstly makes contact with the closest one of the clutch plates 31, and elastically deforms. Then, the wave spring 36 continues to elastically deform, but before the wave spring 36 finishes elastically deforming, the pressing part 32*a* of the piston 32 directly presses the closest one of the clutch plates 31 such that the clutch plates 31 are pressed in contact with each other.

With the aforementioned operation, it is possible to alleviate shock occurring when the clutch-on state is made. Additionally, during elastic deformation of the wave spring 36, the piston 32 makes contact with the closest one of the clutch plates 31 and directly presses the clutch plates 31. Hence, a stress acting on the wave spring 36 is reduced. In addition, the clutch plates 31 can be reliably pressed in contact with each other.

Other Preferred Embodiments

The present disclosure is not limited to the aforementioned preferred embodiment, and a variety of changes or modifications can be made without departing from the scope of the present disclosure.

Figure 7:
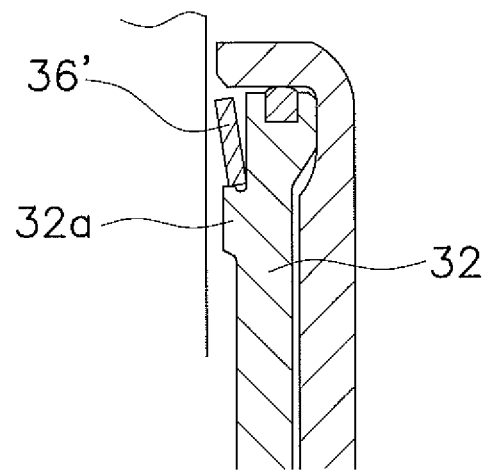
FIG. 7 is a diagram showing an elastic member according to another preferred embodiment.

(a) In the aforementioned preferred embodiment, the wave spring 36 is used as an elastic member mounted to the piston 32. However, the elastic member is not limited to the wave spring 36. For example, as shown in FIG. 7, a coned disc spring 36' may be used as the elastic member.

Figure 8:
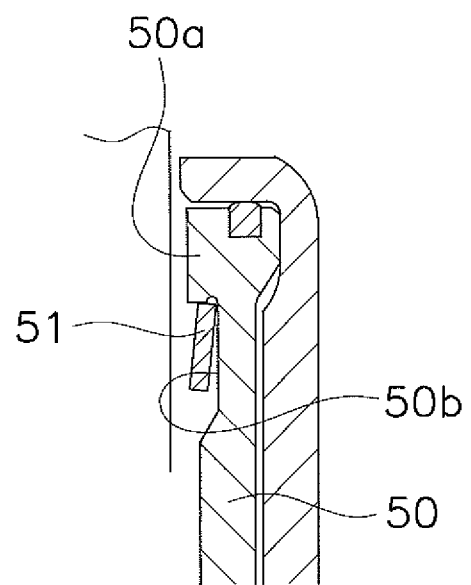
FIG. 8 is a diagram showing an elastic member according to yet another preferred embodiment.

(b) The position of the elastic member is not limited to the outer peripheral end of the piston. For example, as shown in FIG. 8, a piston 50 may be provided with an annular recess 50*b* on the inner peripheral side of a pressing part 50*a*. Moreover, an elastic member 51 (e.g., a coned disc spring, a wave spring, etc.) may be disposed in the annular recess 50*b*.

(c) In the aforementioned preferred embodiment, the present disclosure has been applied to the lock-up device configured to press the piston onto the clutch plates from the turbine side. However, the present disclosure is also applicable to a type of lock-up device configured to press the piston onto the clutch plates from the front cover side that is opposite to the turbine side.

What is claimed is:

1. A lock-up device for a torque converter, the lock-up device configured to transmit a torque from a front cover to a transmission-side member through a turbine, the lock-up device comprising:
   a clutch portion disposed between the front cover and the turbine, the clutch portion including a clutch plate;
   a piston disposed to be movable in an axial direction, the piston including a pressing surface for pressing the clutch plate, the piston configured to turn the clutch portion into a torque transmission state, wherein the piston is provided with an annular groove on an outer peripheral end of the piston, and the groove is opened to an outer peripheral side: and
   an elastic member disposed in the groove and on a same side as the pressing surface of the piston, the elastic member configured to begin to elastically deform before the pressing surface contacts the clutch plate in conjunction with movement of the piston toward the clutch portion, wherein a displacement of the piston from the clutch plate is smaller than a sum of (i) an axial distance of the elastic member from the clutch plate and (ii) an elastic deformability amount of the elastic member.

2. The lock-up device according to claim 1, wherein the piston is configured to directly apply a pressing load to the clutch portion through the pressing surface after the elastic member begins to elastically deform.

3. The lock-up device according to claim 1, wherein the piston and the clutch plate are configured to make contact on the pressing surface, and are configured to be rotated in synchronization with each other.

4. The lock-up device according to claim 1, wherein the annular groove is on the pressing surface, the elastic member protruding toward the clutch portion in the axial direction, with a protruded end thereof located closer to the clutch portion than the pressing surface.

5. The lock-up device according to claim 1, wherein the elastic member is a wave spring, the wave spring having a wavy shape in a plan view.

6. The lock-up device according to claim 1, wherein the elastic member is a coned disc spring.

* * * * *